No. 853,372. PATENTED MAY 14, 1907.
J. H. NUTE.
MACHINE FOR MAKING WOODEN TOOTHPICKS.
APPLICATION FILED JULY 2, 1906.
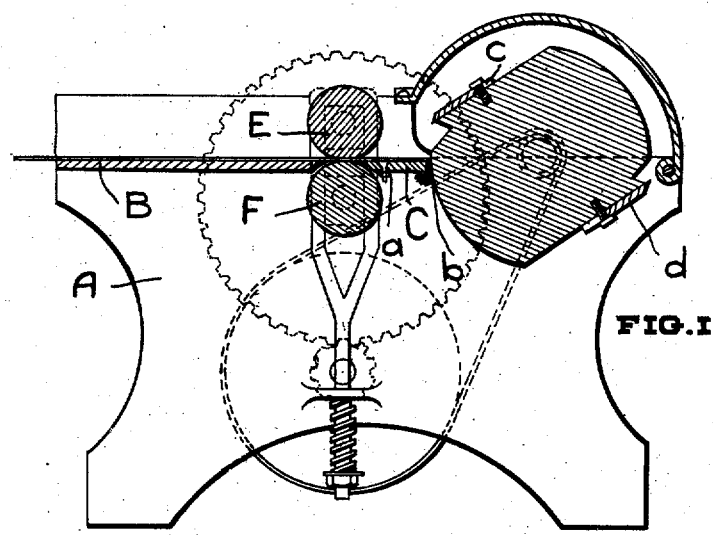
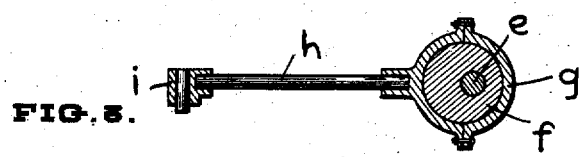
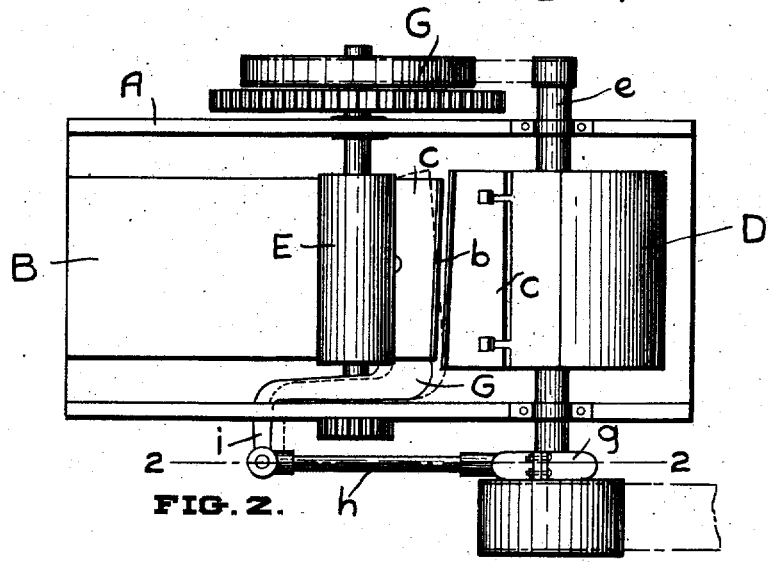
WITNESSES.
INVENTOR.
J. H. NUTE.
BY
ATTY.

UNITED STATES PATENT OFFICE.

JOHN H. NUTE, OF PORTLAND, MAINE.

MACHINE FOR MAKING WOODEN TOOTHPICKS.

No. 853,372.      Specification of Letters Patent.      Patented May 14, 1907.

Application filed July 2, 1906. Serial No. 324,331.

*To all whom it may concern:*

Be it known that I, JOHN H. NUTE, of Portland, in the State of Maine, United States of America, manufacturer, have invented certain new and useful Improvements in Machines for the Manufacture of Wooden Toothpicks, of which the following is a specification.

My invention relates to a machine for manufacturing wooden tooth picks, and the objects of my invention are to provide a simple machine for cutting tapered or "chiseled point" tooth picks from a piece of veneer with a maximum economy of material possible; and it consists essentially of an oscillating plate having a shear blade on the edge thereof, a rotary cutter head having the blades thereon adjusted to shear against the shear blade on the plate when the same is oscillated in its two extreme positions, together with suitable means for feeding the veneer across the blade for oscillating the plate and for rotating the cutter head, all as hereinafter more fully set forth and described in the accompanying specifications and drawings.

Figure 1 is a longitudinal vertical sectional view through my machine. Fig. 2 is a plan view of the same. Fig. 3 is a sectional detail along the line 2—2, Fig. 2.

In the drawings like letters of reference indicate corresponding parts in each figure.

A is the frame of any suitable form supporting the feeding table B. At the end of the feeding table and on the same plane therewith an oscillating plate C is provided preferably being pivoted to a bar $a$ extending beneath it and secured to the side members of the frame. To the edge of this plate a suitable shear blade $b$ is secured by suitable means, that shown being bolted to a flange on the inside of the plate.

D is a rotary cutter head supported with its axis substantially horizontal and having blades $c$ and $d$ adjustably secured thereon and so adjusted as to shear against the knife $b$ on extreme positions. The cutter D is supported on a suitable shaft $e$ which is rotated from a suitable source of power.

The plate C may be oscillated by any suitable means, but I prefer to utilize the shaft $e$ for the purpose, providing thereon an eccentric $f$ having a strap $g$ encircling the same connected by a rod $h$ to an arm $i$ formed integral with or secured to the plate C. This eccentric is so adjusted as to bring the plate into its extreme positions at the moments when the knives are passing the edge of the same. By this means the veneer will be cut alternately wide at one end and narrow at the other.

The usual means will be provided for feeding the material along the feeding table and across the oscillating plate compsiring, as shown, two feeding rollers E and F adjustably held in position and preferably rotated from the shaft $c$ by a suitable system of gearing G.

In operation the veneer is fed across the oscillating plate at such a speed relative to that of the head that the tooth picks will be cut the desired width. The eccentric $f$ is so set in relation to the cutting blades $c$ and $d$ that when one of these latter is in cutting position the plate G carrying the shear blade $b$ will be in its extreme oscillated position out of parallel with the axis of the revolving head. When the other cutter $d$ reaches a like position the eccentric will have oscillated the plate to its opposite position in which the blade $b$ is again out of parallel with the axis of the revolving head but this time at a reverse angle whereby a tapered section will be cut from the strip of veneer with the wide ends alternately on each side, thus keeping the strip even and producing tooth picks of the desired form. The dotted lines indicate this second position.

An important feature of the invention is the knife blade $b$ on the edge of the plate which insures that the tooth picks are cut evenly without splinters.

It will be readily understood that while I have described with great particularity of detail one specific embodiment of my invention, my invention is not limited thereto as certain changes within the scope of the appended claims might be made in the details of construction without departing from the spirit of my invention.

What I claim as my invention is:—

In a machine for cutting tooth picks from veneer, the combination with an oscillating plate, having rollers operating above the same, of a shear blade secured to the edge of the plate, a cylindrical cutter head, a shaft supporting the same, bearings for the shaft, shear blades longitudinally extending on the cutter head adapted to co-act with the shear blade on the oscillating plate, a crank secured to the oscillating plate, an eccentric secured to the cutter head shaft, a strip encircling the eccentric, a rod connecting the strip with the crank on the plate as and for the purpose specified.

Moncton, 13th June, 1906.

JOHN H. NUTE.

In the presence of—
　DAVID I. WELCH,
　EUNICE L. WELCH.